US008214468B2

(12) United States Patent
Law et al.

(10) Patent No.: US 8,214,468 B2
(45) Date of Patent: Jul. 3, 2012

(54) SYSTEM AND METHOD FOR CONFIGURING DEVICES FOR WIRELESS COMMUNICATION

(75) Inventors: Boon Kiat Law, Singapore (SG); Eng Leok Chng, Singapore (SG)

(73) Assignee: Dell Products L.P., Round Rock, TX (US)

( * ) Notice: Subject to any disclaimer, the term of this patent is extended or adjusted under 35 U.S.C. 154(b) by 651 days.

(21) Appl. No.: 12/121,393

(22) Filed: May 15, 2008

(65) Prior Publication Data

US 2009/0287798 A1    Nov. 19, 2009

(51) Int. Cl.
G06F 15/173 (2006.01)
G06F 15/16 (2006.01)
(52) U.S. Cl. ......... 709/220; 709/221; 455/424; 455/425
(58) Field of Classification Search .................. 370/310, 370/328; 709/220, 221; 455/425, 424
See application file for complete search history.

(56) References Cited

U.S. PATENT DOCUMENTS

| | | | |
|---|---|---|---|
| 6,675,009 B1 | 1/2004 | Cook | 455/420 |
| 6,718,172 B1 | 4/2004 | Cook et al. | 455/452.2 |
| 7,039,365 B1 | 5/2006 | Cook | 455/67.13 |
| 7,158,583 B2 | 1/2007 | Iancu et al. | 375/316 |
| 7,277,054 B2 * | 10/2007 | Alanen et al. | 342/464 |
| 7,283,505 B1 * | 10/2007 | Meenan et al. | 370/338 |
| 7,313,384 B1 | 12/2007 | Meenan et al. | 455/410 |
| 7,346,344 B2 | 3/2008 | Fontaine | 455/418 |
| 7,430,181 B1 | 9/2008 | Hong | 370/254 |
| 7,493,653 B2 | 2/2009 | Klein | 726/3 |
| 7,508,787 B2 * | 3/2009 | Doshi et al. | 370/328 |
| 7,738,891 B2 * | 6/2010 | Tenhunen et al. | 455/512 |
| 7,940,744 B2 * | 5/2011 | Lehotsky et al. | 370/351 |
| 2002/0197985 A1 | 12/2002 | Tourrilhes et al. | 455/420 |
| 2004/0116109 A1 | 6/2004 | Gibbs et al. | 455/419 |
| 2004/0160907 A1 | 8/2004 | Perlman | 370/319 |
| 2004/0246936 A1 | 12/2004 | Perlman | 370/343 |
| 2005/0073968 A1 | 4/2005 | Perlman | 370/315 |
| 2005/0078624 A1 | 4/2005 | Shu et al. | 370/328 |
| 2005/0143007 A1 | 6/2005 | Guy et al. | 455/41.3 |
| 2006/0040645 A1 * | 2/2006 | Grilli et al. | 455/412.1 |
| 2006/0067295 A1 * | 3/2006 | Lehotsky et al. | 370/351 |
| 2006/0168153 A1 * | 7/2006 | Lin | 709/220 |
| 2006/0168438 A1 | 7/2006 | Klein | 713/1 |
| 2006/0239209 A1 | 10/2006 | Ayyagari et al. | 370/254 |
| 2007/0036358 A1 | 2/2007 | Nguyen et al. | 380/270 |
| 2007/0078994 A1 * | 4/2007 | Wilson et al. | 709/229 |
| 2007/0091861 A1 * | 4/2007 | Gupta et al. | 370/338 |
| 2007/0104126 A1 * | 5/2007 | Calhoun et al. | 370/328 |
| 2007/0109972 A1 | 5/2007 | MacDonald | 370/252 |
| 2007/0127417 A1 | 6/2007 | Kalika | 370/338 |
| 2007/0268506 A1 | 11/2007 | Zeldin | 358/1.13 |
| 2007/0271588 A1 * | 11/2007 | Bunn et al. | 725/111 |
| 2008/0052026 A1 * | 2/2008 | Amidon et al. | 702/104 |
| 2008/0139125 A1 | 6/2008 | Son et al. | 455/67.11 |
| 2008/0175187 A1 | 7/2008 | Lowry et al. | 370/328 |
| 2009/0010230 A1 | 1/2009 | Lee et al. | 370/338 |

* cited by examiner

*Primary Examiner* — Wing Chan
*Assistant Examiner* — Kostas Katsikis
(74) *Attorney, Agent, or Firm* — Baker Botts L.L.P.

(57) ABSTRACT

A system and method for configuring devices for wireless communication are disclosed. A method may include detecting one or more available wireless access points. The method may also include accessing filtering information including at least one of (a) factory default information identifying one or more factory defaults for each available wireless access point and (b) a secured status of each available wireless access point. The method may also include filtering the available wireless access points based on at least the accessed filtering information. The method may further include selecting one of the filtered wireless access points as an associated wireless access point to be associated with an information handling system based on at least one of (a) a signal strength of each filtered available wireless access points and (b) a user input.

20 Claims, 3 Drawing Sheets

SYSTEM AND METHOD FOR CONFIGURING DEVICES FOR WIRELESS COMMUNICATION

TECHNICAL FIELD

The present disclosure relates in general to device configuration, and more particularly to a system and method for configuration of devices for wireless communication.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

With recent advances in network technology and improved affordability of networking devices, information handling system users are increasingly implementing networks (e.g., local areas networks or LANs) that utilize wireless transmissions (e.g., wireless fidelity or "WI-FI") and wire-line transmissions in their homes and/or businesses. For example, users may implement a home or business network including an information handling system, one or more wireless-capable network devices, and a wireless access point communicatively coupled to the information handling system and network devices. Such a network may allow an information handling system (or a user thereof) to communicate with the one or more network devices via the wireless access point or vice versa.

However, despite the increasing popularity of home and business networking systems, configuration complexity of such systems has prevented widespread acceptance. While network installation and setup for experienced users has been greatly simplified with setup wizards and advances in usability features included in operating systems, network configuration remains a difficult challenge for many users, particularly home consumers. These configuration challenges lead to negative customer experience and numerous technical support calls. For example, one company has reported that it receives in excess of 20,000 technical support calls per day related to digital home products, the majority attributable to wireless access point installation and setup.

One difficulty with conventional approaches to configuring a number of devices is that the user must often navigate a number screens and/or dialog boxes to successfully configure a network. In addition, a user may be required to run a plurality of setup programs, which may add to the user's confusion. For example, using traditional approaches, if a user desires to wirelessly couple an information handling system, a wireless access point, and a printer, the user must often run three different setup programs—one for each of the information handling system, the wireless access point, and the printer. Also, in some traditional approaches, a user must connect the information handling system to the wireless access point via a wired connection in order to configure the devices, which may be counterintuitive for a novice user.

SUMMARY

In accordance with the teachings of the present disclosure, disadvantages and problems associated with configuring devices for wireless communication may be substantially reduced or eliminated.

In accordance with one embodiment of the present disclosure, a method for configuring an information handling system for wireless communication with an associated wireless access point is provided. The method may include storing a wireless data file on a computer-readable medium, the wireless data file including factory default information identifying factory defaults regarding one or more wireless access points. The method may also include storing a program of instructions on the computer-readable medium. The program of instructions may be operable to, when executed (a) access factory default information from the wireless data file, and (b) configure the information handling system and the associated wireless access point for secure wireless communication between the information handling system and the associated wireless access point based on at least the accessed factory default information.

In accordance with another embodiment of the present disclosure, a method for configuring devices for wireless communication is provided. The method may include detecting one or more available wireless access points. The method may also include accessing filtering information including at least one of (a) factory default information identifying one or more factory defaults for each available wireless access point and (b) a secured status of each available wireless access point. The method may also include filtering the available wireless access points based on at least the accessed filtering information. The method may further include selecting one of the filtered wireless access points as an associated wireless access point to be associated with an information handling system based on at least one of (a) a signal strength of each filtered available wireless access points and (b) a user input.

In accordance with a further embodiment of the present disclosure, an information handling system may include a processor and a computer-readable medium communicatively coupled to the processor. The computer-readable medium may have stored thereon a program of instructions operable to, when executed by the processor (i) detect one or more available wireless access points; (ii) access filtering information including at least one of (a) factory default information identifying one or more factory defaults for each available wireless access point and (b) a secured status of each available wireless access point; (iii) filter the available wireless access points based on at least the accessed filtering information; and (iv) select one of the filtered wireless access points as an associated wireless access point to be associated with an information handling system based on at least one of (a) a signal strength of each filtered available wireless access points and (b) a user input.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
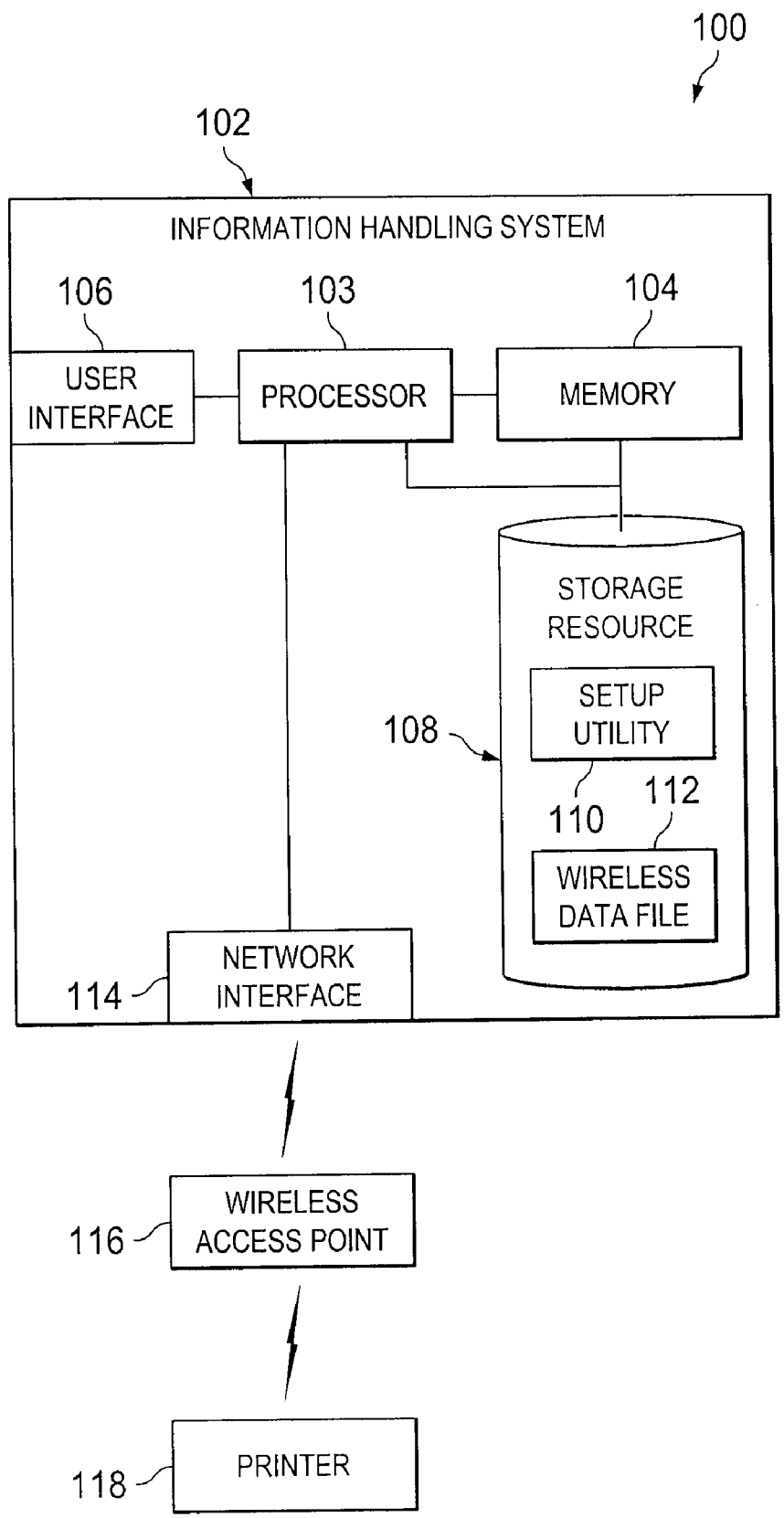
FIG. 1 illustrates a block diagram of an example wireless network system, in accordance with an embodiment of the present disclosure.

Preferred embodiments and their advantages are best understood by reference to FIGS. 1-4B, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage resource, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

One type of information handling system is a portable computer, also known as a "laptop" and/or "notebook" computer. Portable computers often contain components that are similar to their desktop counterparts and perform the same functions, but are miniaturized and optimized for mobile use and efficient power consumption. For example, portable computers may have liquid crystal displays (LCDs), built-in keyboards, and may utilize a touchpad (also known as a trackpad) or a pointing stick for input, although an external keyboard or mouse may be attached. In addition, portable computers may run on a single main battery or from an external analog current/direct current (AC/DC) adapter that can charge the battery while also supplying power to the computer itself.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

For the purposes of this disclosure, the term "wire-line transmissions" may be used to refer to all types of electromagnetic communications over wires, cables, or other types of conduits. Examples of such conduits include, but are not limited to, metal wires and cables made of copper or aluminum, fiber-optic lines, and cables constructed of other metals or composite materials satisfactory for carrying electromagnetic signals. Wire-line transmissions may be conducted in accordance with teachings of the present disclosure over electrical power lines, electrical power distribution systems, building electrical wiring, conventional telephone lines, Ethernet cabling (10baseT, 100baseT, etc.), coaxial cables, T-1 lines, T-3 lines, ISDN lines, ADSL, and/or any other suitable medium.

For the purposes of this disclosure, the term "wireless transmissions" may be used to refer to all types of electromagnetic communications which do not require a wire, cable, or other types of conduits. Examples of wireless transmissions which may be used include, but are not limited to, personal area networks (PAN) (e.g., BLUETOOTH), local area networks (LAN), wide area networks (WAN), narrowband personal communications services (PCS), broadband PCS, circuit switched cellular, cellular digital packet data (CDPD), radio frequencies, such as the 800 MHz, 900 MHz, 1.9 GHz and 2.4 GHz bands, infra-red and laser.

Examples of wireless transmissions for use in local area networks (LAN) include, but are not limited to, radio frequencies, especially the 900 MHz and 2.4 GHz bands, for example IEEE 802.11 and BLUETOOTH, as well as infrared, and laser. Examples of wireless transmissions for use in wide area networks (WAN) include, but are not limited to, narrowband personal communications services (nPCS), personal communication services (PCS such as CDMA, TMDA, GSM) circuit switched cellular, and cellular digital packet data (CDPD), etc.

FIG. 1 illustrates a block diagram of an example wireless network system 100, in accordance with an embodiment of the present disclosure. As depicted, system 100 may include an information handling system 102, a wireless access point 116, and a printer 118.

Information handling system 102 may generally be operable to receive data from, and/or transmit data to printer 118 and/or another device via wireless access point 116. In certain embodiments, information handling system 102 may be a portable computer. As shown in FIG. 1, information handling system 102 may include a processor 103, a memory 104 communicatively coupled to processor 103, a user interface 106, a storage resource 108, and a network interface 114.

Processor 103 may comprise any system, device, or apparatus operable to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, storage resource 108, and/or another component of information handling system 102.

Memory 104 may be communicatively coupled to processor 103 and may comprise any system, device, or apparatus operable to retain program instructions or data for a period of time (e.g., computer-readable media). Memory 104 may comprise random access memory (RAM), electrically erasable programmable read-only memory (EEPROM), a PCM-CIA card, flash memory, magnetic storage, opto-magnetic storage, or any suitable selection and/or array of volatile or non-volatile memory that retains data after power to information handling system 102 is turned off.

User interface 106 may be communicatively coupled to processor 103 and may include any instrumentality or aggregation of instrumentalities by which a user may interact with information handling system 102. For example, user interface 106 may permit a user to input data and/or instructions into information handling system 102 (e.g., via a keyboard, pointing device, and/or other suitable means), and/or otherwise manipulate information handling system 102 and its associated components. User interface 106 may also permit information handling system 102 to communicate data to a user, e.g., by means of a display device.

Storage resource 108 may be communicatively coupled to processor 103 and/or memory 104 and may include any system, device, or apparatus operable to retain program instructions or data for a period of time (e.g., computer-readable media) and that retains data after power to information handling system 102 is turned off. Storage resource 108 may include one or more hard disk drives, magnetic tape libraries, optical disk drives, magneto-optical disk drives, compact disk drives, compact disk arrays, disk array controllers, and/or any computer-readable medium operable to store data. As shown in FIG. 1, storage resource 108 may include a setup utility 110 and a wireless data file 112. Setup utility 110 may include any suitable program of instructions executable on processor 103 and operable to configure information handling system 102, wireless access point 116, and/or printer 118 for wireless communication, as described in greater detail below. Wireless data file 112 may include any database, table, and/or other data structure operable to store data regarding network configuration parameters associated with wireless access point 116, printer 118 and/or other network-capable devices (e.g., service set identifiers (SSIDs), wireless encryption protocol (WEP) keys, and/or other parameters related to network communication and network security, encryption keys, MAC addresses, serial numbers, manufacturers, model numbers, and/or other identifying information).

Network interface 114 may include any suitable system, apparatus, or device operable to serve as an interface between information handling system 102 and wireless access point 116 (e.g., a wireless network interface card). Network interface 114 may enable information handling system 102 to communicate to wireless access point 116 via wireless transmissions and/or wire-line transmissions using any suitable transmission protocol and/or standard, including without limitation all transmission protocols and/or standards enumerated below with respect to the discussion of wireless access point 116. In some embodiments, network interface 114 may provide physical access to a networking medium and/or provide a low-level addressing system (e.g., through the use of Media Access Control addresses). In certain embodiments, network interface 114 may include a buffer for storing packets received from wireless access point 116 and/or a controller configured to process packets received by wireless access point 116.

Wireless access point 116 may include any system, device or apparatus operable to communicatively couple one or more devices together to form a network. Wireless access point 116 may be a part of a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data) via wireless transmissions. For example, wireless access point 116 may be configured to communicate with other devices via wireless transmissions, and thus may communicatively couple a plurality of wireless communication devices together to form a wireless network. In certain embodiments, wireless access point 116 may also be configured to communicate to one or more devices via wire-line transmissions, and thus may relay data among wireless devices and wired devices. Wireless access point 116 may be configured to communicate with other devices via any suitable communication protocol (e.g., TCP/IP) and/or standard (e.g., IEEE 802.11, WI-FI).

Printer 118 may include any device, system or apparatus, used alone and/or in combination with one or more information handling systems to print images (e.g., text and/or pictures) on a recording medium (e.g., paper, transparencies, and/or any other suitable medium) using an imaging medium (e.g., toner, ink, and/or other suitable medium). Printer 118 may include, without limitation, a toner-based imaging device or an inkjet imaging device.

Figure 2:
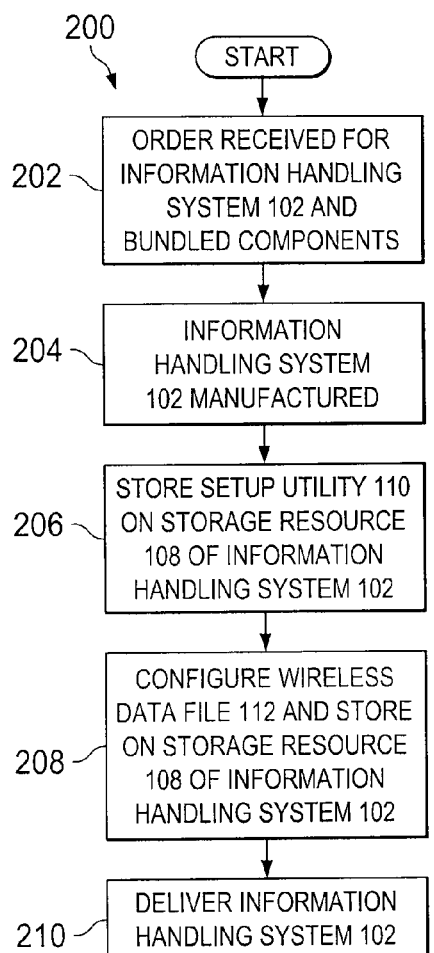
FIG. 2 illustrates a flow chart of an example method for configuring an information handling system for wireless communication prior to delivering the information handling system to an end user, in accordance with an embodiment of the present disclosure.

FIG. 2 illustrates a flow chart of an example method 200 for configuring information handling system 102 for wireless communication prior to delivering the information handling system 102 to an end user, in accordance with an embodiment of the present disclosure. According to one embodiment, method 200 preferably begins at step 202. As noted above, teachings of the present disclosure may be implemented in a variety of configurations of system 100. As such, the preferred initialization point for method 200 and the order of the steps 202-210 comprising method 200 may depend on the implementation chosen.

At step 202, an order may be received for information handling system 102. The order may also include a selection of bundled components (e.g., wireless access point 116, printer 118, and/or other components) to be included with the ordered information handling system 102. The order may be received by a manufacturer and/or vendor of information handling system 102 via telephone, online, mail, or any other suitable manner.

At step 204, information handling system 102 may be manufactured according to specifications set forth in the received order. At step 206, the vendor and/or manufacturer may store setup utility 110 on storage resource 108 of information handling system 102.

At step 208, the vendor and/or manufacturer may configure wireless data file 112 and store wireless data file 112 in storage resource 108 of information handling system 102. If a bundled wireless access point was ordered with information handling system 102, wireless data file 112 may be configured with factory default identifying information regarding the bundled wireless access point (e.g., factory default SSID, factory default administrator user identification, factory default administrator password, wireless setup URL).

For example, the Linksys 150N wireless access point manufactured by Cisco Systems, Inc. may have a wireless setup URL of "http://192.168.1.1/Wireless_basic.asp", a factory default SSID of "linksys," and a factory default administrator password of "admin." Accordingly, if a Linksys 150N wireless access point is the bundled wireless access point ordered with information handling system 102, wireless data file 112 may be configured with such parameters. On the other hand, if a bundled wireless access point was not ordered, wireless data file 112 may be configured with factory default identifying information for different types (e.g., brand, manufacturer, models) of wireless access points that may be supported by information handling system 102.

At step 210, the information handling system 102 may be shipped. After completion of step 210, method 200 may end.

Although FIG. 2 discloses a particular number of steps to be taken with respect to method 200, it is understood that method 200 may be executed with greater or lesser steps than those depicted in FIG. 2. In addition, although FIG. 2 discloses a certain order of steps to be taken with respect to method 200, the steps comprising method 200 may be completed in any suitable order. Method 200 may be implemented using system 100 or any other system operable to implement method 200. In certain embodiments, method 200 may be implemented partially or fully in software and/or firmware embodied in tangible computer-readable media.

Figure 3:
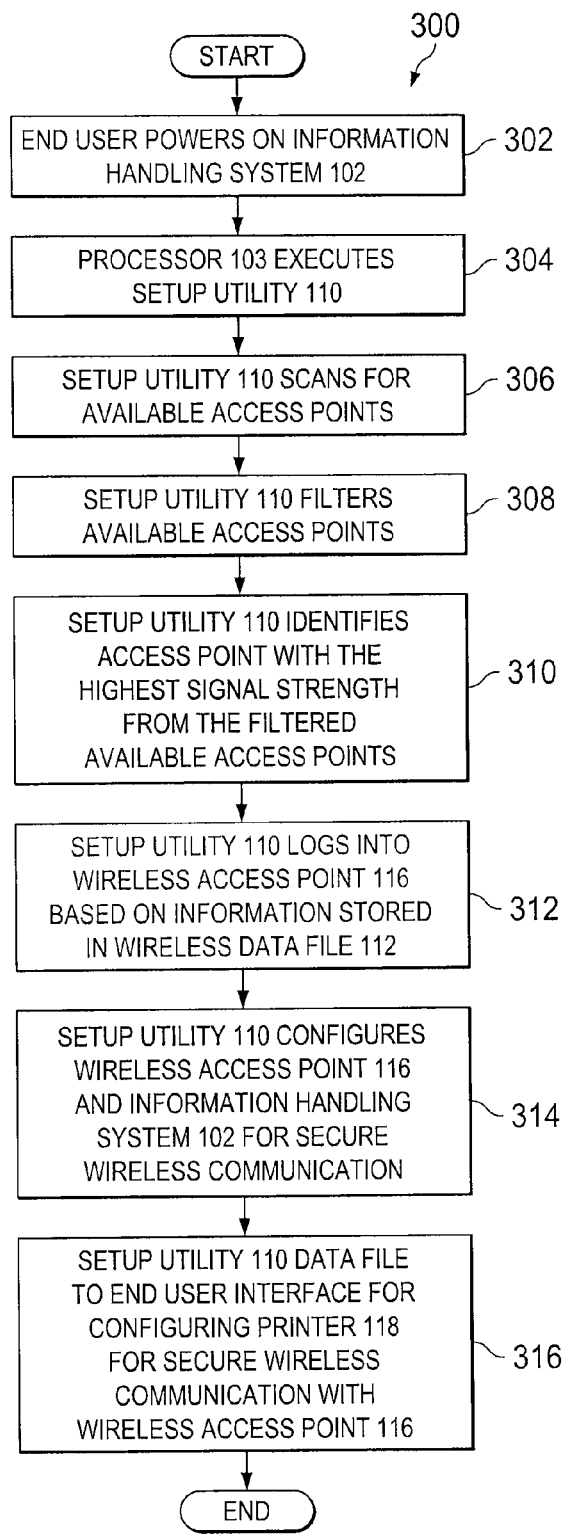
FIG. 3 illustrates a flow chart of an example method for auto-configuring devices for wireless communication, in accordance with an embodiment of the present disclosure.
Figure 4A:
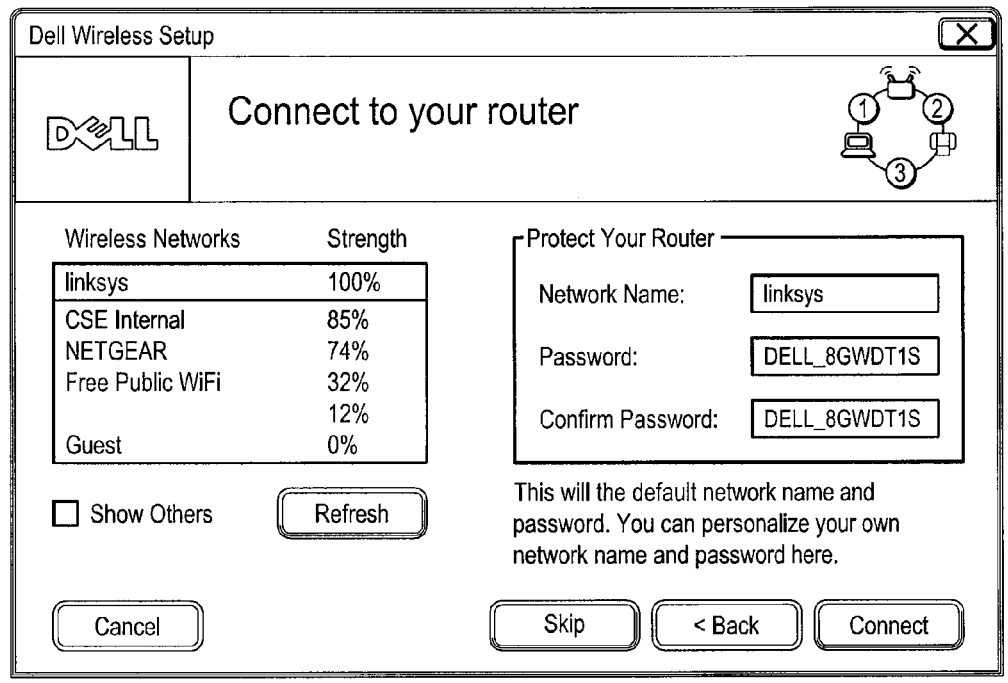
FIGS. 4A-4B illustrate example user interface screens displayed during a method for auto-configuring devices for wireless communication, in accordance with the present disclosure.
Figure 4B:
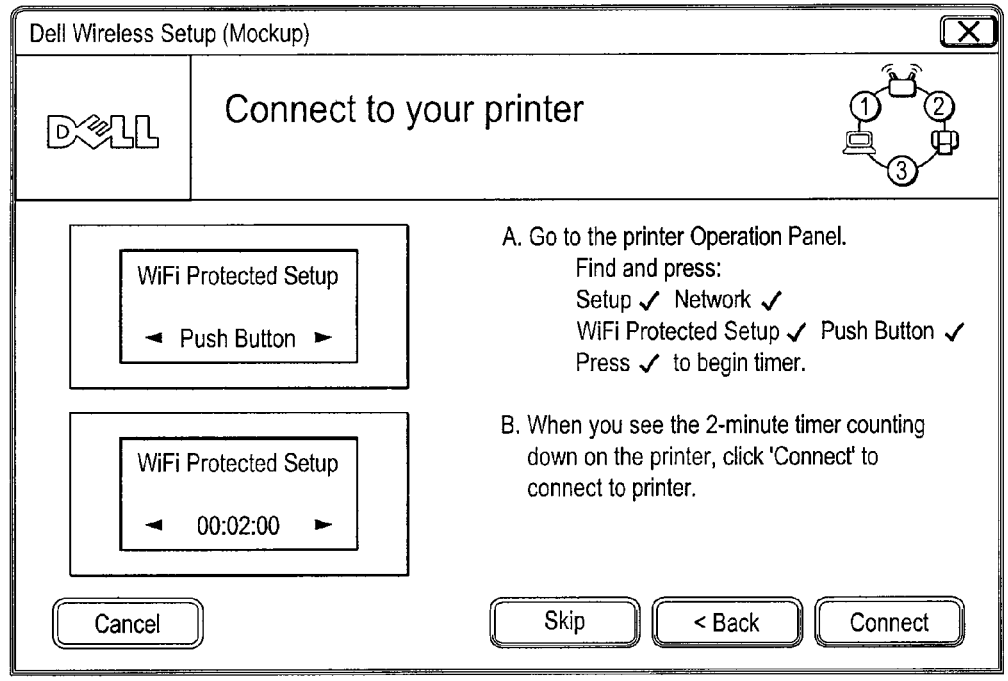

FIG. 3 illustrates a flow chart of an example method 300 for auto-configuring devices (e.g., information handling system 102, wireless access point 116, and/or printer 118) for wireless communication, in accordance with an embodiment of the present disclosure. FIGS. 4A-4B illustrate example user interface screens displayed (e.g., via a display device at user interface 106) during method 300, in accordance with the present disclosure. According to one embodiment, method 300 preferably begins at step 302. As noted above, teachings of the present disclosure may be implemented in a variety of configurations of system 100. As such, the preferred initialization point for method 300 and the order of the steps 302-316 comprising method 300 may depend on the implementation chosen.

At step 302, after receiving information handling system 102, an end user may power on information handling system 102 for the first time (e.g., the initial end user boot of information handling system 102).

At step 304, processor 103 may begin execution of setup utility 110.

At step 306, setup utility 110 may scan for available wireless access points that may be detected by information handling system 102.

At step 308, setup utility 110 may filter the available wireless access points based on one or more parameters. In certain embodiments, filtering may be based on parameters stored in wireless data file 112 (e.g., data regarding a bundled wireless access point and/or data regarding supported wireless access points) in order to identify available wireless access points that may be unconfigured. Any such unconfigured wireless access point may be the wireless access point that is to be configured for communication with information handling system 102.

For example, because many wireless access points have factory default settings and a wireless access point to be configured with a new information handling system may have its default settings, setup utility 110 may filter based on such factory default settings (e.g., SSID) in order to find the wireless access point 116 to be configured for communication with information handling system 102. As a specific example, if a LINKSYS 150N wireless access point is bundled with information handling system 102, setup utility 110 may filter on the factory default SSID value of "linksys," such that available wireless access points with an SSID other than "linksys" are filtered from the available access points. In a situation where a wireless access point is not bundled with information handling system 102, setup utility may filter on factory default SSID values for all supported wireless access points.

In the same or alternative embodiments, setup utility 110 may filter the available wireless access points based on whether such access points are unsecured or secured. Because many wireless access points are factory configured, such filtering may filter secured wireless access points (which are likely not to be newly-shipped wireless access points) from the available access points.

At step 310, setup utility 110 may identify, from the filtered available access points, the wireless access point with the highest signal strength at information handling system 102, and select that wireless access point as the wireless access point 116 to be configured for wireless communication with information handling system 102. In certain embodiments, setup utility 110 may prompt the end user (e.g., via user interface 106) to select the wireless access point 116 from a plurality of wireless access points with the highest signal strengths, such as shown in FIG. 4A for example. In other embodiments, setup utility 110 may prompt the end user to select the wireless access point 116 only if there exists an ambiguity as to which wireless access point has the highest signal strength (e.g., two or more filtered available access points have approximately equal signal strengths).

At step 312, setup utility 110 may log into the wireless access point 116 based on information (e.g., wireless access point factory default parameters) stored in wireless data file 112. As a specific example, if wireless access point 116 is a LINKSYS 150N wireless access point, setup utility 110 may login to wireless access point using the factory default user identification (NULL) and factory default password ("admin") stored in wireless data file 112.

At step 314, setup utility 110 may configure wireless access point 116 and information handling system 102 for secure wireless communication. For example, setup utility may set one or more parameters associated with information handling system 102 and/or wireless access point 116 to permit secure wireless communication between information handling system 102 and wireless access point 116. Such parameters may be assigned default values by setup utility 110 and/or may be set by the end user via user interface 106 (see FIG. 4A). In some embodiments, setup utility 110 may enable a wireless security standard on wireless access point 116 (e.g., Wired Equivalent Privacy (WEP) or WI-FI Protected Access (WPA)) and set a passphrase, encryption key, password, and/or similar security phrase consistent with such wireless security standard. In such embodiments, setup utility 110 may also configure information handling system 102 in accordance with the wireless security standard and/or security phrase. In such embodiments, the setup utility 110 may set the security phrase based on a service tag, serial number, and/or other unique identifier associated with information handling system 102.

In the same or alternative embodiments, setup utility 110 may change the administrator user identification and/or administrator password from their factory default values (e.g., to prevent others from using such default values to access wireless access point). In these and other embodiments, setup utility 110 may change the SSID of wireless access point (e.g., to reduce the possibility of similarly-named access points in the same geographic area and/or to indicate to setup utility 110 that the wireless access point has been setup).

At step 316, setup utility 110 may display to the end user instructions for configuring printer 118 for secure wireless communication with wireless access point 118, as shown in FIG. 4B. For example, if printer 118 is WI-FI Protected Setup (WPS)-compliant, setup utility 110 may provide instructions to the end user regarding the steps the end user may take to configure printer 118 for secure wireless communication. After completion of step 316, method 300 may end. In the same or alternative embodiments, setup utility 110 may display to the end user instructions for configuring another wireless device, for example a WPS-compliant camera, scanner, and/or wireless headset.

Although FIG. 3 discloses a particular number of steps to be taken with respect to method 300, it is understood that method 300 may be executed with greater or lesser steps than those depicted in FIG. 3. In addition, although FIG. 3 discloses a certain order of steps to be taken with respect to method 300, the steps comprising method 300 may be completed in any suitable order. Method 300 may be implemented using system 100 or any other system operable to implement method 300. In certain embodiments, method 300 may be implemented partially or fully in software embodied in tangible computer-readable media.

Using the methods and systems disclosed herein, disadvantaged associated with traditional approaches to configuring devices (e.g., information handling systems, wireless access points, and printers) for wireless communication may be reduced or eliminated. For example, the methods and systems disclosed herein may allow configuration of multiple wireless devices by using only one application in a manner that may be intuitive to even the most novice user.

Although the present disclosure has been described in detail, it should be understood that various changes, substitutions, and alterations can be made hereto without departing from the spirit and the scope of the invention as defined by the appended claims.

What is claimed is:

1. A method for configuring an information handling system for wireless communication with an associated wireless access point, comprising:
   storing a wireless data file on a computer-readable medium integral to an information handling system during manufacturing of the information handling system and prior to delivery of the information handling system to a user, the wireless data file including factory default information identifying factory defaults regarding one or more wireless access points; and
   storing a program of instructions on the computer-readable medium, the program of instructions operable to, when executed:
      access the factory default information from the wireless data file;
      configure the information handling system and the associated wireless access point for secure wireless communication between the information handling system and the associated wireless access point based on at least the factory default information; and
      change the factory default information and configure the information handling system and the associated wireless access point based on the changed factory default information.

2. The method of claim 1, the factory default information including at least one of a factory default service set identifier (SSID), factory default administrator user identification, and factory default administrator password for each of the one or more wireless access points.

3. The method of claim 1, wherein the wireless data file includes factory default information regarding the associated wireless access point.

4. The method of claim 1, wherein the program of instructions is operable to configure the information handling system and an associated wireless access point for secure wireless communication by:
   detecting one or more available wireless access points;
   filtering the available wireless access points based on at least one of the factory default information and a secured status of each available wireless access point; and
   selecting one of the filtered wireless access points as an associated wireless access point to be associated with the information handling system based on at least one of (a) a signal strength of each filtered available wireless access points and (b) a user input.

5. The method of claim 4, wherein the program of instructions is further operable to configure the information handling system and the associated wireless access point for secure wireless communication by setting one or more parameters associated with at least one of the information handling system and the associated wireless access point.

6. The method of claim 5, wherein the one or more parameters includes at least one of a security phrase, an administrator user identification, an administrator password, and an SSID.

7. The method of claim 1, the program of instructions further operable to display to a user instructions for configuring a wireless device other than the information handling system for secure communication with the associated wireless access point.

8. A method for configuring an information handling system for wireless communication with an associated wireless access point, comprising:
   storing a wireless data file on a computer-readable medium, the wireless data file including factory default information identifying factory defaults regarding a plurality of wireless access points; and
   storing a program of instructions on the computer-readable medium, the program of instructions operable to, when executed:
      access the factory default information from the wireless data file for an associated wireless access point selected from the plurality of wireless access points;
      configure the information handling system and the associated wireless access point for secure wireless communication between the information handling system and the associated wireless access point based on at least the factory default information; and
      change the factory default information and configure the information handling system and the associated wireless access point based on the changed factory default information.

9. The method of claim 8, the factory default information including at least one of a factory default service set identifier (SSID), factory default administrator user identification, and factory default administrator password for the associated wireless access point.

10. The method of claim 8, wherein the wireless data file includes factory default information regarding the associated wireless access point.

11. The method of claim 8, wherein the program of instructions is operable to configure the information handling system and an associated wireless access point for secure wireless communication by:
   detecting one or more available wireless access points;

filtering the available wireless access points based on at least one of the factory default information and a secured status of each available wireless access point; and selecting one of the filtered wireless access points as an associated wireless access point to be associated with the information handling system based on at least one of (a) a signal strength of each filtered available wireless access points and (b) a user input.

12. The method of claim 11, wherein the program of instructions is further operable to configure the information handling system and the associated wireless access point for secure wireless communication by setting one or more parameters associated with at least one of the information handling system and the associated wireless access point.

13. The method of claim 12, wherein the one or more parameters includes at least one of a security phrase, an administrator user identification, an administrator password, and an SSID.

14. The method of claim 8, the program of instructions further operable to display to a user instructions for configuring a wireless device other than the information handling system for secure communication with the associated wireless access point.

15. An information handling system comprising:
a processor; and
a computer-readable medium communicatively coupled to the processor and having stored thereon during manufacturing of the information handling system and prior to delivery of the information handling system to a user:
a wireless data file on a computer-readable medium, the wireless data file including factory default information identifying factory defaults regarding one or more wireless access points; and
a program of instructions operable to, when executed by the processor:
access the factory default information from the wireless data file for an associated wireless access point selected from the one or more wireless access points; and
configure the information handling system and the associated wireless access point for secure wireless communication between the information handling system and the associated wireless access point based on at least the factory default information; and
change the factory, default information and configure the information handling system and the associated wireless access point based on the changed factory default information.

16. The information handling system of claim 15, the factory default information including at least one of a factory default service set identifier (SSID), factory default administrator user identification, and factory default administrator password for each of the one or more wireless access points.

17. The information handling system of claim 15, wherein the program of instructions is operable to configure the information handling system and an associated wireless access point for secure wireless communication by:
detecting one or more available wireless access points;
filtering the available wireless access points based on at least one of the factory default information and a secured status of each available wireless access point; and
selecting one of the filtered wireless access points as an associated wireless access point to be associated with the information handling system based on at least one of (a) a signal strength of each filtered available wireless access points and (b) a user input.

18. The information handling system of claim 17, wherein the program of instructions is further operable to configure the information handling system and the associated wireless access point for secure wireless communication by setting one or more parameters associated with at least one of the information handling system and the associated wireless access point.

19. The information handling system of claim 18, wherein the one or more parameters includes at least one of a security phrase, an administrator user identification, an administrator password, and an SSID.

20. The information handling system of claim 15, the program of instructions further operable to display to a user instructions for configuring a wireless device other than the information handling system for secure communication with the associated wireless access point.

* * * * *